US005503051A

United States Patent [19]

Stauber

[11] Patent Number: 5,503,051

[45] **Date of Patent: *Apr. 2, 1996**

[54] APPARATUS FOR TRIMMING FLAT PRODUCTS, ESPECIALLY MULTI-SHEET PRINTED PRODUCTS

[75] Inventor: Hans-Ulrich Stauber, Grüt, Switzerland

[73] Assignee: Ferag AG, Hinwil, Switzerland

[ * ] Notice: The term of this patent shall not extend beyond the expiration date of Pat. No. 5,501,127.

[21] Appl. No.: 168,199

[22] Filed: Dec. 17, 1993

[30] Foreign Application Priority Data

Dec. 18, 1992 [DE] Germany .......................... 42 43 059.3

[51] Int. Cl.[6] .............................. B62D 1/03; B65H 35/08

[52] U.S. Cl. ............................ 83/154; 83/349; 83/409.2; 83/583; 83/592; 83/934

[58] Field of Search ............................ 83/150, 151, 154, 83/349, 582, 583, 564, 404.1, 404.3, 404.4, 675, 592, 934, 409.1, 409.2, 435.1, 100

[56] References Cited

U.S. PATENT DOCUMENTS

| | | | |
|---|---|---|---|
| 1,054,524 | 2/1913 | Fosdick | 83/409.2 |
| 2,245,868 | 6/1941 | Melby | 83/409.1 |
| 2,617,461 | 11/1952 | Bach | 83/404.3 |
| 4,038,893 | 8/1977 | Reist | 83/154 |
| 4,496,140 | 1/1985 | Stobb . | |
| 4,683,790 | 8/1987 | Bittner | 83/592 |
| 4,706,951 | 11/1987 | Leu . | |
| 4,721,296 | 1/1988 | Mowry . | |
| 5,113,731 | 5/1992 | Reist . | |

FOREIGN PATENT DOCUMENTS

| | | |
|---|---|---|
| 3434609 | 1/1987 | Germany . |

*Primary Examiner*—Rinaldi I. Rada
*Assistant Examiner*—Charles Goodman
*Attorney, Agent, or Firm*—Bell, Seltzer, Park & Gibson

[57] ABSTRACT

An apparatus for trimming folded multi-sheet printed products along the bloom edge and along each of the opposite side edges of each product. The apparatus comprises a first cellular wheel (2) which is mounted for rotation about a vertical axis and which receives the products in upwardly open cells and trims their bloom edges. A second cellular wheel (4) is mounted for rotation about a horizontal axis and receives the products from the first wheel in radially open cells and trims the products along their opposite side edges. Each wheel mounts first blade members (26;36) mounted along an edge of each cell, and a fixed counter blade (29;39) is provided which engages the first blade members upon rotation of the wheel. The wheel also includes an annular running surface (47), and the counter blade is connected to a guide member (46) which is positioned to engage the running surface.

13 Claims, 13 Drawing Sheets

APPARATUS FOR TRIMMING FLAT PRODUCTS, ESPECIALLY MULTI-SHEET PRINTED PRODUCTS

BACKGROUND OF THE INVENTION

The invention relates to an apparatus for trimming flat products, especially multi-sheet printed products such as newspapers, magazines, brochures and the like.

An apparatus of this generic type is known from EP-A-0 367 715 and corresponding U.S. Pat. No. 5,113,731, wherein circular, fixedly-mounted counter blades, which are rotatable about respective axes, are disposed opposite the two end faces of a cellular wheel. In practice, it has proven to be difficult to maintain accurately, between the counter blades and the blades disposed on the cellular wheel, predetermined blade clearances such that consistently clean cutting edges are obtained on all printed products. This is therefore the object of the invention.

SUMMARY OF THE INVENTION

The above and other objects and advantages of the present invention are achieved by the provision of an apparatus which comprises a support stand, and a cellular wheel comprising a plurality of generally radially extending spokes which define cells therebetween which are disposed about the circumference of the wheel. A first blade member is mounted to each of the spokes along at least one side edge thereof so as to define a side edge of the associated cell. Also, the cellular wheel includes a laterally facing annular running surface.

A fixed bearing element is provided for mounting the cellular wheel to the support stand for rotation about a central axis, and at least one counter blade is mounted to the bearing element so as to operatively engage the first blade members upon rotation of the cellular wheel about said central axis. Also, the counter blade is mounted to a guide member, which is positioned to engage the running surface on the cellular wheel.

The guidance, according to the invention, of the guide member of each positionally fixed counter blade on the running surface of the cellular wheel makes the blade clearances independent of positional changes of the circulating first blade members, which changes can be induced during operation, for example by bearing play in the mountings of the cellular wheel or by load-dependent and/or heat-dependent deformations of the cellular wheel. According to the invention, blade clearances with close tolerances, for example in the order of magnitude of 0.02 to 0.05 mm even in the case of a cellular wheel having an external diameter in the order of magnitude of 1,300 to 2,000 mm, can successfully be maintained.

A particularly advantageous embodiment of the present invention enables flat-lying products to be trimmed along up to three edges.

BRIEF DESCRIPTION OF THE DRAWINGS

An illustrative embodiment of the invention is explained in further detail below with reference to diagrammatic drawings, in which.

DETAILED DESCRIPTION OF THE PREFERRED EMBODIMENTS

Figure 1:
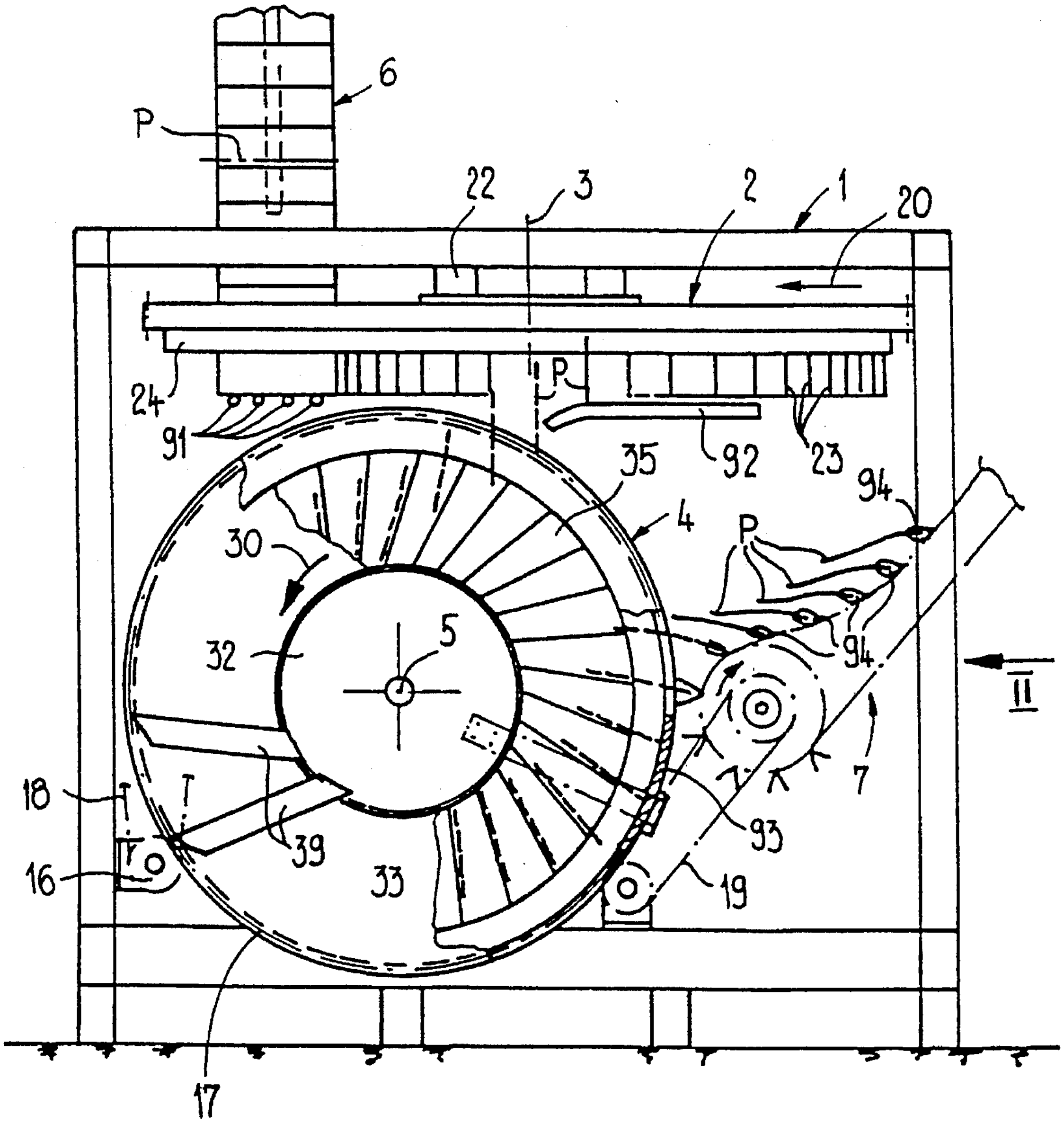
FIG. 1 shows a side view of a device according to the invention, viewed in the direction of the arrow I in FIG. 2.

The object of the represented device is to trim multi-leaved, folded and stapled printed products P along their edge facing away from the fold, at the "bloom" as it is known, and along two side edges running at right-angles to the fold and to the bloom. In an upper region of a cuboid-shaped stand 1, a first cellular wheel claim 2 is mounted rotatably about a vertical axle 3. Below this, a second cellular wheel 4 is mounted rotatably about a horizontal axle 5. The printed products P are fed by a feed conveyor 6 to the first cellular wheel 2, where they are trimmed individually at their bloom (so-called anterior trim), then ejected from the first cellular wheel 2 individually into the second cellular wheel 4, there trimmed along their two side edges (so-called head/foot trim) and finally transported individually onward by a delivery conveyor 7.

The two cellular wheels 2 and 4 and the two conveyors 6 and 7 are jointly continuously driven by a motor 8 via a gear system 9. For this purpose, there extends vertically upwards from the gear system 9 a shaft 10, which engages by a drive pinion 11, disposed on the said shaft, in a gear rim 12 on the outer periphery of the first cellular wheel 2. In addition, a horizontal shaft 13 extends from the gear system 9 to a synchronous belt drive 14, which drives a lower horizontal shaft 15; on this shaft there are disposed two elongated drive pinions 16, which mesh with a respective gear rim 17 on the outer periphery of the second cellular wheel 4. From these gear rims 17, the two conveyors 6 and 7 are driven by means of a respective synchronous belt drive 18 and 19.

Figure 2:
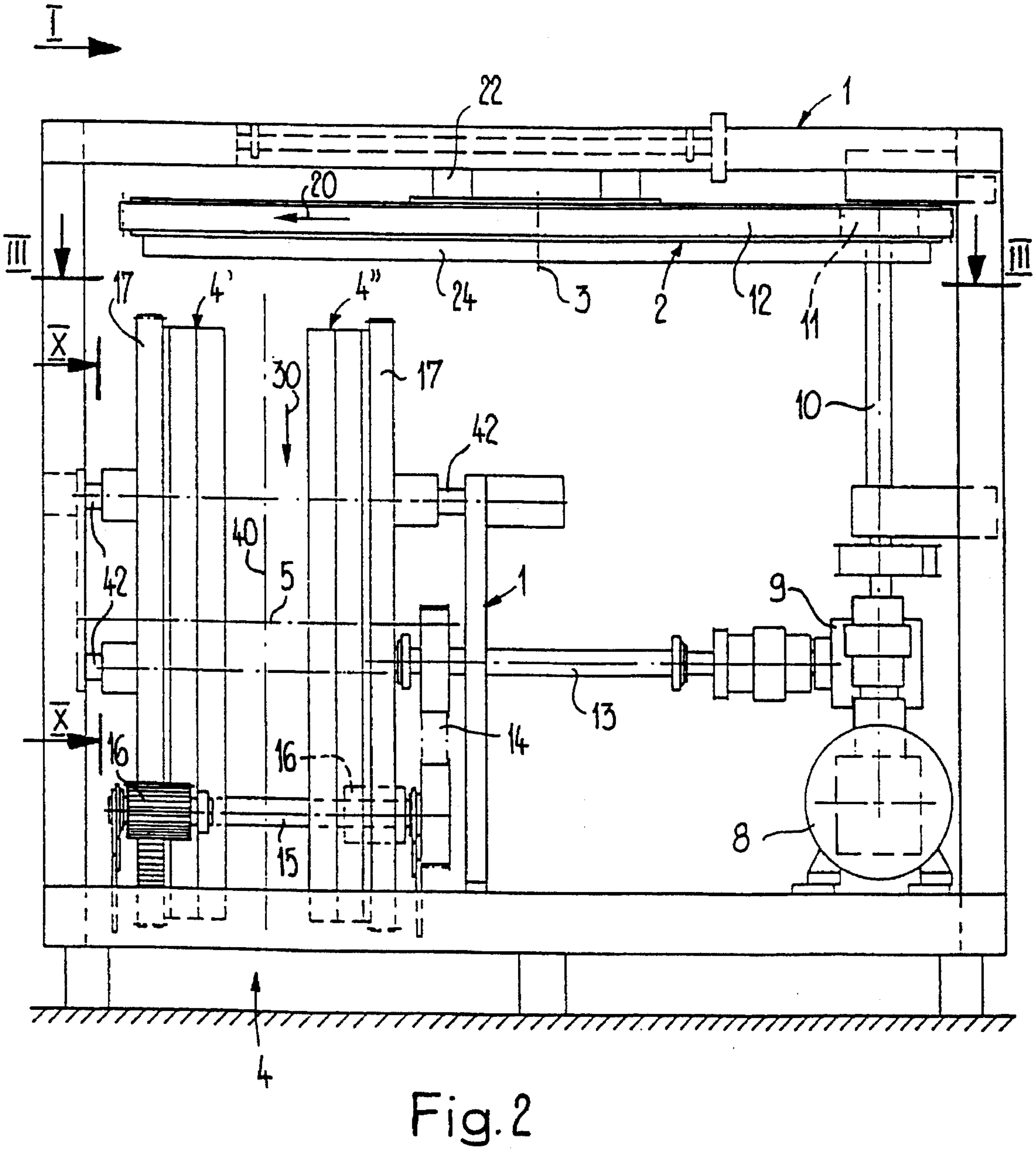
FIG. 2 shows the front view in the direction of the arrow II in FIG. 1.
Figure 3:
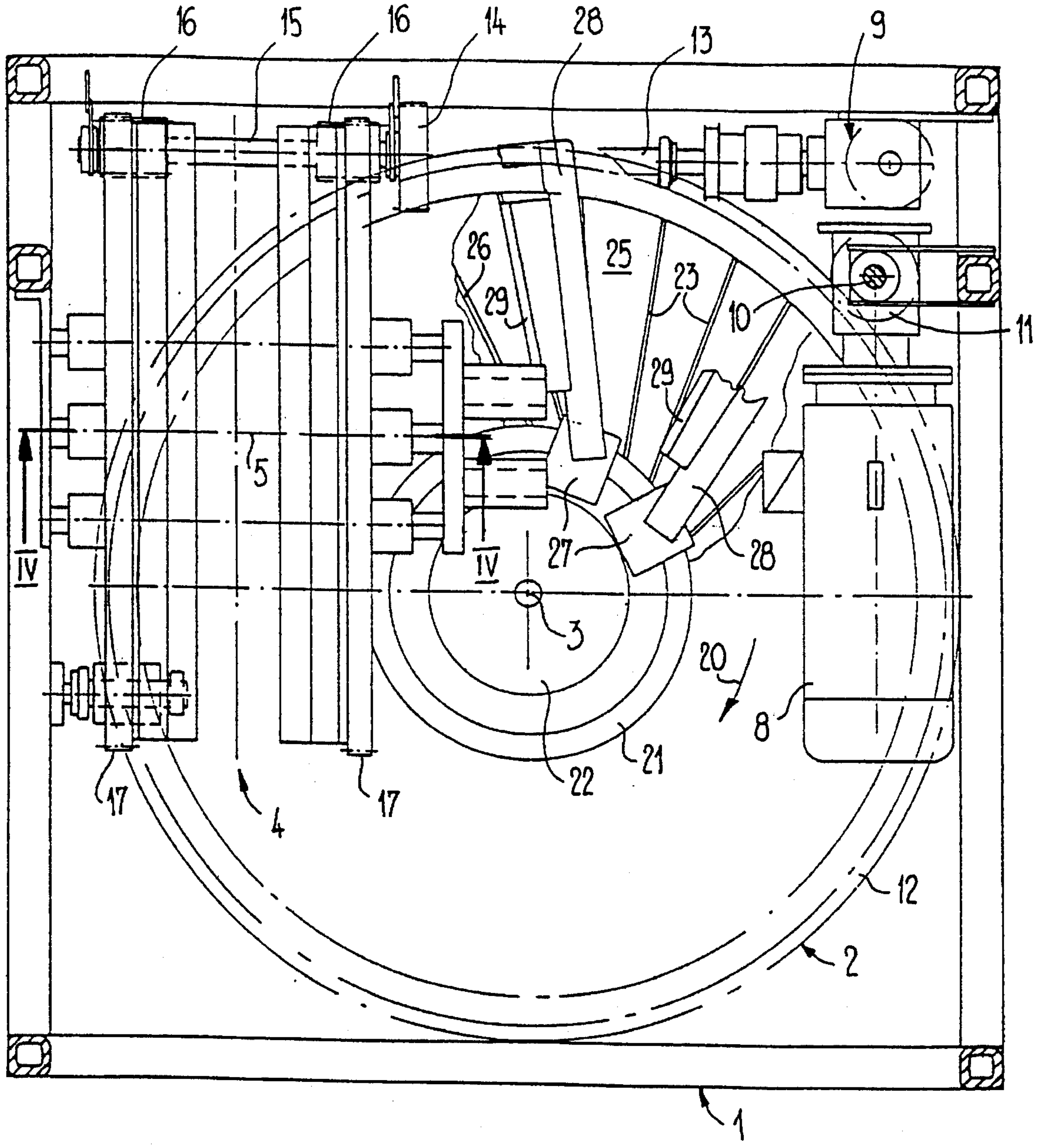
FIG. 3 shows the top view belonging to FIGS. 1 and 2, drawn partly as a horizontal section in the plane III—III in FIG. 2.

The first cellular wheel 2, which rotates in the direction of the arrow 20 in FIGS. 1, 2 and 3, has a hub 21, which is mounted in an axially non-displaceable arrangement on a bearing element 22 and is connected by thirty spokes 23 to a cylindrical shell 24. Thirty equal upwardly and downwardly open cells 25 are thereby formed. The number of spokes 23 and cells 25 is not critical; this can be defined from case to case according to requirement. Each of the cells 25 is designed to receive a printed product with the bloom lying horizontally at the top and to clamp it against one of the adjacent spokes 23, using a pressing apparatus of a type which can be known, such that the printed product P can be trimmed at its bloom. For this purpose, a horizontal blade 26 is fastened to the upper edge of each of the spokes 23 in such a way that it circulates with the first cellular wheel 2.

The blades 26 are, according to FIG. 3, backwards inclined; each of them forms an angle of about 20° with a radius originating from the axle 3.

The bearing element 22 of the first cellular wheel 2 supports two blade bearings 27, on which there is mounted a respective cutter bar 28 supporting a counter blade 29 which is positionally fixed in operation. Of the two counter blades 29, only one respectively assumes a working position in which it interacts with the circulating blades 26. If the first used counter blade 29 has become blunt, then the second counter blade 29 is swivelled, by pivoting of its cutter bar 28, into its working position and the blunted counter blade is swivelled, together with its cutter bar, into a rest position.

No attempt is made to represent and describe more fully the apparatuses, disposed on the first cellular wheel 2, for pressing the printed products P and for guiding and swivelling the counter blades 29, since reference can be made in this regard to corresponding, below-described arrangements in the second cellular wheel 4.

The second cellular wheel 4, which rotates in the direction of the arrow 30 in FIG. 1, is made up of two cellular wheel halves 4' and 4". Each cellular wheel half 4' 4" has a hub 31, which is mounted on a bearing element 32 and is connected by thirty spokes 33 to a cylindrical shell 34 and, via the said shell, to one respectively of the aforementioned gear rims 17. In this way, the two cellular wheel halves jointly form thirty cells 35, each of which extends between two spokes 33 disposed parallel to each other at an axial distance apart. Here too, the number of cells 35 is not critical; the number coincides preferably, but not necessarily, with the number of cells 25 in the first cellular wheel 2. Fastened to each spoke 33 there is a blade which is inclined rearwards at an angle of, for example, 20° in the radial direction.

Figure 6:
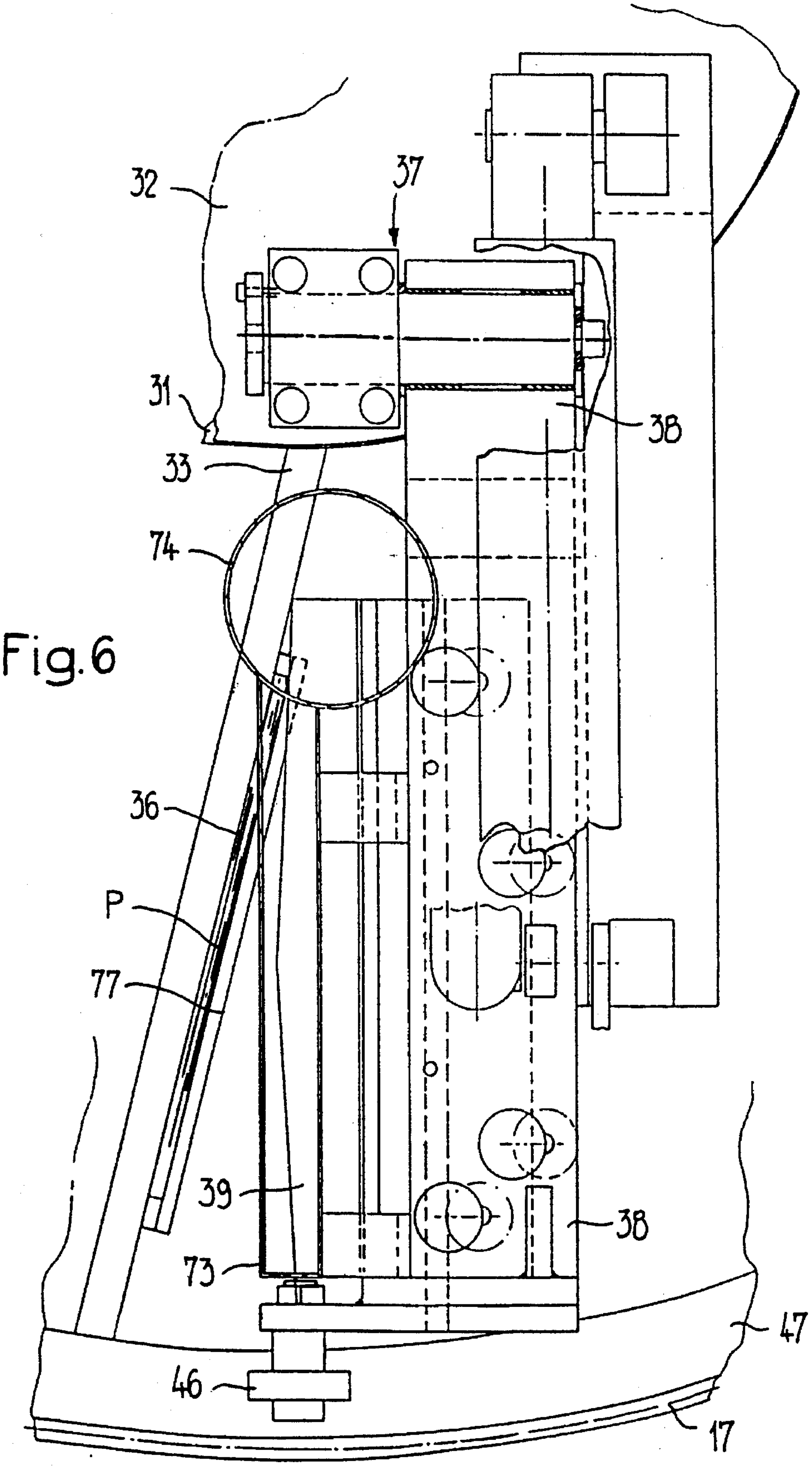
FIG. 6 shows the view in the direction of the arrow VI in FIG. 5.

Each of the two hubs 31 supports two blade bearings 37, on which a respective cutter bar 38 with a counter blade 39 is mounted pivotably and such that it can be adjusted in a direction parallel to the rotary axle 5. Each of the two halves 4' and 4" of the second cellular wheel 4 is thus assigned two counter blades of which only one respectively, however, assumes its working position in which it interacts with the circulating blades 36 on the associated cellular wheel half, whilst the other counter blade remains in reserve. Each counter blade 39 has, according to FIG. 6, a gable-shaped cutter.

The entire arrangement of the second cellular wheel 4 with its two halves 4' and 4" and with the associated counter blades 39 is symmetrical in relation to a vertical plane of symmetry 40, i.e. one which is perpendicular to the rotary axle 5. This applies to every operating adjustment of the second cellular wheel 4.

The two bearing elements 32 for the second cellular wheel 4 are guided, by means respectively of three slide bushes 41 configured thereon, on a total of three guide rods 42, which are disposed parallel to the horizontal axle 5 at equal distances therefrom and are fastened by their ends in the stand 1. To each of the two hubs 31 there is additionally fastened a central threaded bush 43. With these threaded bushes 43, of which one is right-handed and the other is left-handed and both of which have arithmetically identical pitches, there is respectively engaged a corresponding threaded section 44 on a common spindle 45. The spindle 45 extends along the horizontal axle 5 and is mounted in an axially nondisplaceable arrangement in the stand 1. By rotation of the spindle 45 in the one or other direction, the two bearing elements 32, and hence the two halves 4' and 4" of the second cellular wheel 4, can be adjusted, according to the format of the printed products P to be trimmed, towards or away from each other. For the rotation of the spindle 45, a handwheel or indeed a, for example, electric servo motor can be provided.

Each of the two cutter bars 38 supports, at its free end distant from the associated blade bearing 37, a guide member 46, in the represented example a running roller which is mounted in a freely rotatable arrangement eccentrically, i.e. adjustably, on the cutter bar 38. The guide member 46 runs, in the operating position of the associated cutter bar 38, on a flat, annular running surface 47 on the gear rim 17 of the associated half of the second cellular wheel 4. Each of the positionally fixed counter blades 39 is thereby guaranteed, in its operating position, to form with the associated circulating blades 36 an accurately adjustable and constant blade clearance.

Figure 7:
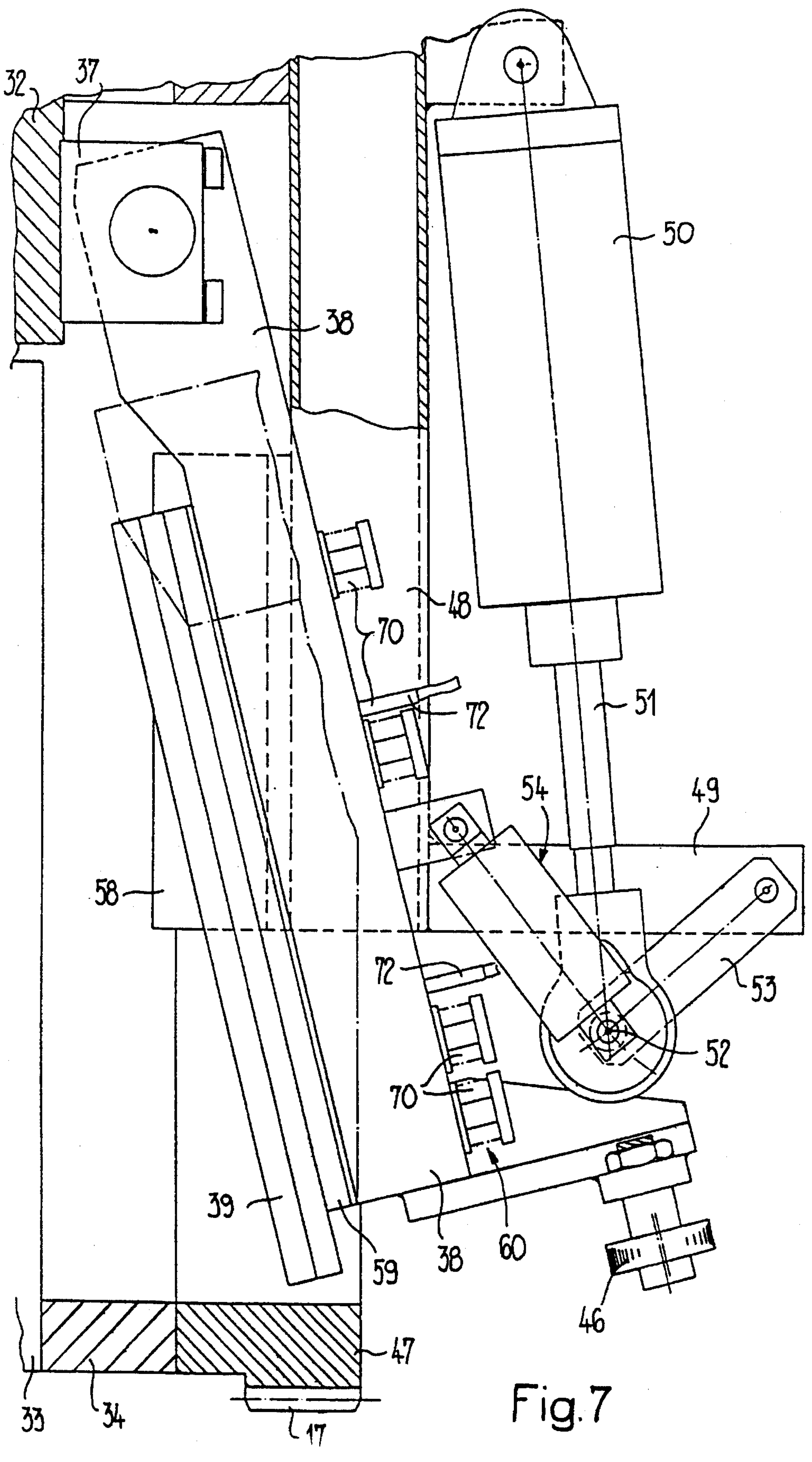
FIG. 7 shows a detail from FIG. 5 but in a rest position, further enlarged.

In order to press the guide member 46 against the associated running surface 47 and in order to swivel out of the operating position according to FIGS. 4B to 6 into a rest position according to FIG. 7, each cutter bar 38 is assigned a pressure and swivel apparatus, which exhibits an approximately radial supporting bar 48 fastened to the associated bearing element 32 and an extension arm 49 which juts out from the said supporting bar parallel to the horizontal axle 5. On the supporting bar 48 there is mounted a hydraulic or pneumatic cylinder 50, the piston rod of which forms a control member 51 and is connected by a joint 52 to a connecting rod 53 and a coupling member 54. The connecting rod 53 is mounted, by its end facing away from the joint 52, on the extension arm 49 and forms together with the coupling member 54 a toggle lever. The coupling member 54 is made up of a housing 55 mounted on the joint 52, in which housing a ram 56 is displaceably guided and is pretensioned in the axial direction by a spring arrangement 57. The ram 56 is connected articularly to the associated cutter bar 38.

In the operating position of the counter blade 39, the piston rod forming the control member 51 is retracted. The toggle lever formed by the connecting rod 53 and coupling member 54 herein assumes a somewhat more than stretched over-dead-centre position. The force at which the running roller 46 is pressed against the running surface 47 is determined by the pretensioning of the spring arrangement 57. The cutting forces acting, during operation, upon the counter blade 39 are transmitted from the cutter bar 38 to a positionally fixed supporting element 58, which is made of synthetic material possessing good sliding properties. Should the counter blade 39 in question be swivelled away from the associated cellular wheel half of the second cellular wheel 4, then the control member 51 is extended, 80 that the toggle lever 53, 54 assumes, according to FIG. 7, an angled-off position.

Figure 8:
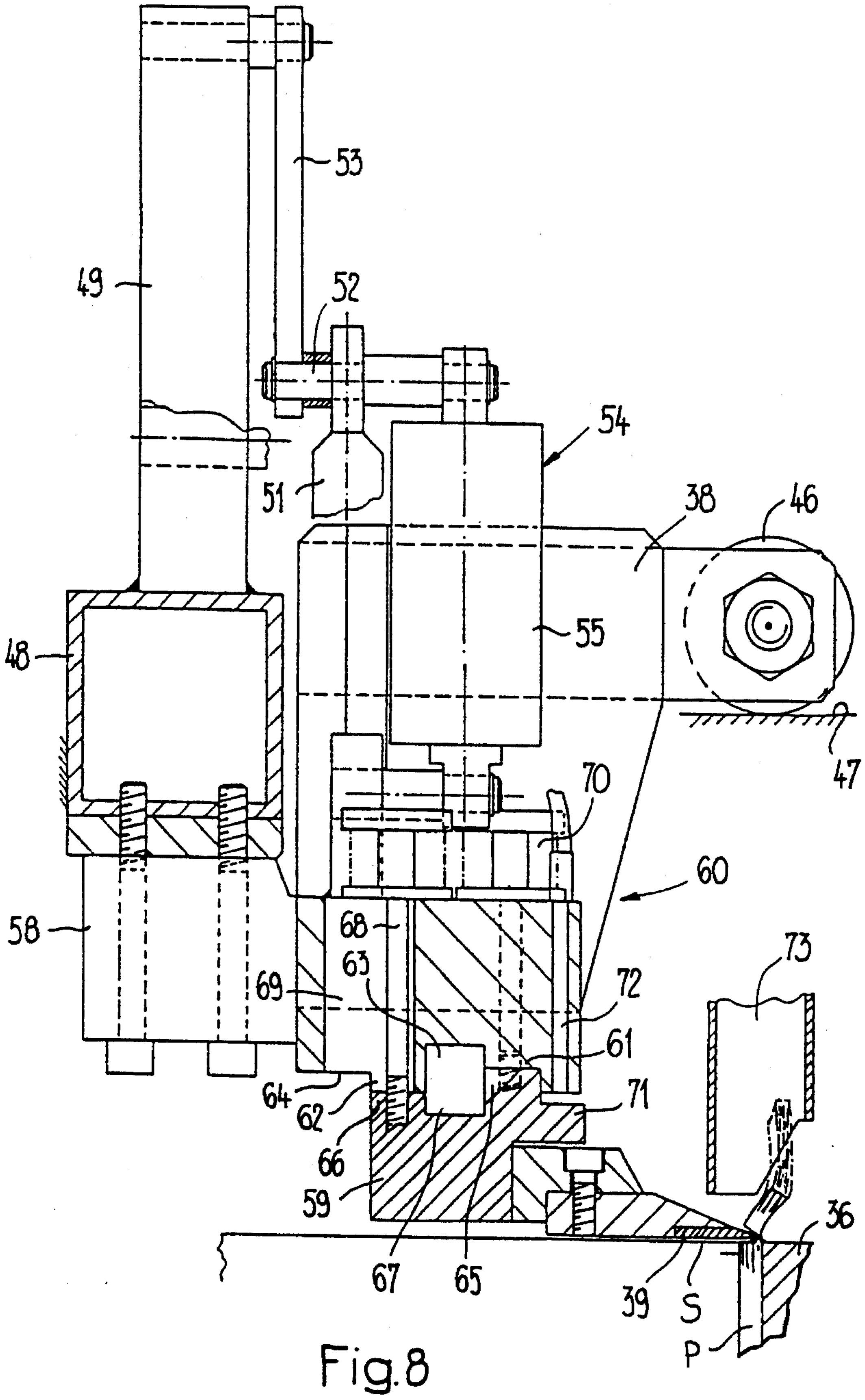
FIG. 8 shows the cross-section VIII—VIII in FIG. 5, turned by 90° and enlarged.
Figure 9:
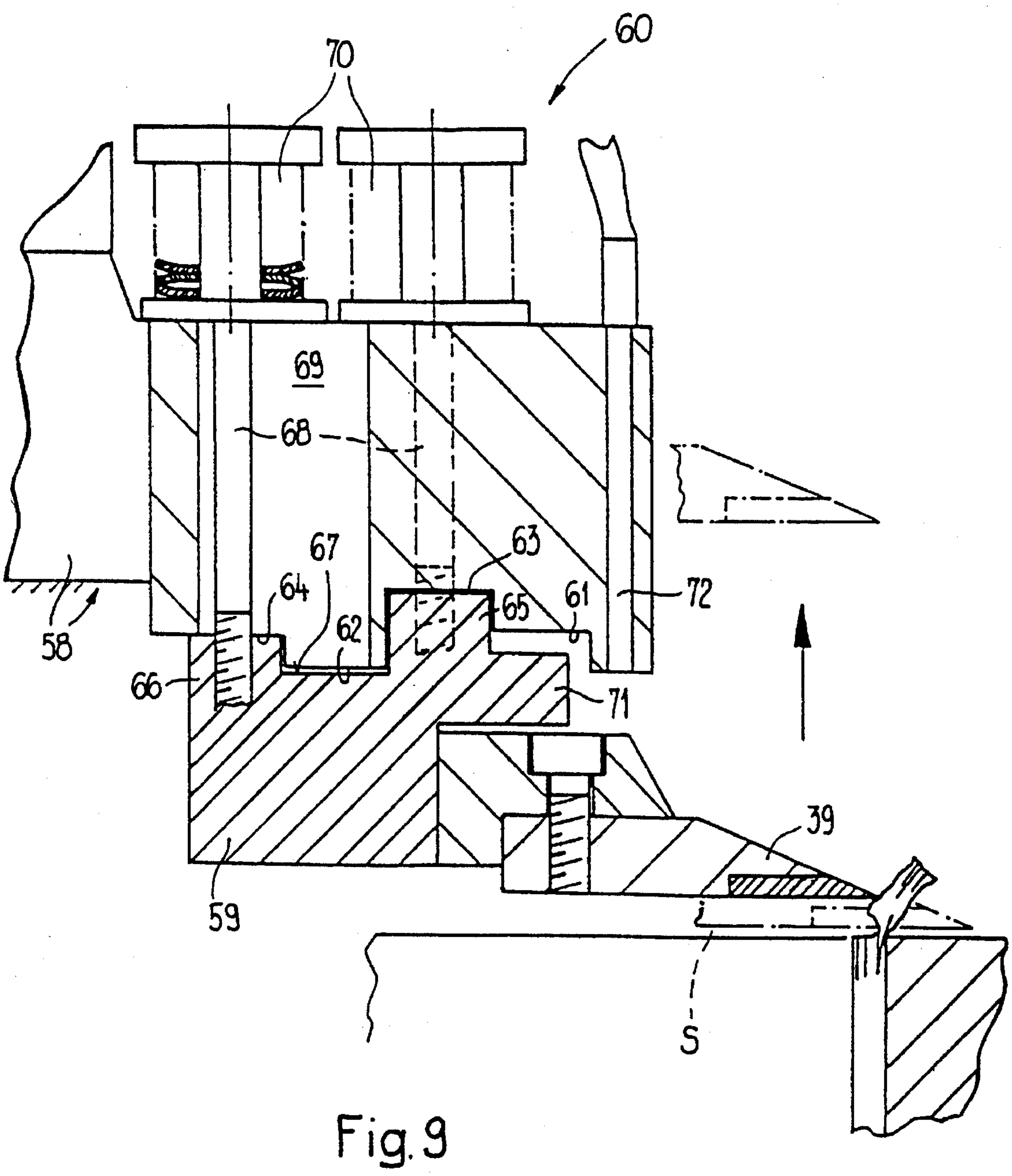
FIG. 9 shows a detail from FIG. 8, further enlarged.

According to FIGS. 8 and 9, each of the counter blades 39 is fastened to a mounting 59, which is connected by an overload-protection device 60 to the associated cutter bar 38. Forming part of the overload-protection device 60 are a front seat 61 and a rear seat 62 on the cutter bar 38 plus a recess 63, configured between these seats 61 and 62, and a recess 64, configured behind seat 62, in the cutter bar 38. Bearing against the seats 61 and 62 there is normally a respective projection 65 and 66, which projections are configured on the mounting 59 and are separated from each other by a recess 67. Screwed into the mounting 59 are a plurality of tie rods 68, which extend through a respective long hole 69 in the cutter bar 38 and are pretensioned, on the side of the cutter bar facing away from the mounting 59, by a respective spring arrangement 70. In the represented example, the spring arrangements 70 are formed by a respective cup spring assembly, as can be seen primarily from FIG. 9. The mounting 59 additionally has a front lug 71, which interacts with sensors 72 fastened to the associated cutter bar 38.

Whenever a counter blade 39 becomes overloaded, the associated mounting 59 is displaced out of its normal position portrayed in FIG. 8 into the position portrayed in FIG. 9. The two projections 65 and 66 hereupon slide rearwards from their seats 61 and 62 and are drawn by the pretensioned tie rods 68 into one respectively of the two recesses 63 and 64, whereby, on the one hand, the normal blade clearance S (FIG. 8) is increased many times over (FIG. 9) and, on the other hand, any further displacement of the mounting 59 in relation to the associated cutter bar 38 is prevented. In addition, the lug 71 disappears from the monitoring range of the associated sensors 72, so that these emit a signal which is taken for an emergency signal and is used to reverse the associated cylinder 50, so that the control member 51 is extended and the cutter bar 38 in question is thereby swivelled into its rest position according to FIG. 7.

To each of the cutter bars 38 there is additionally fastened a mouthpiece 73 of a suction installation for extracting cut-off paper strips. The mouthpiece 73 is a box which is elongated in the radial direction of the second cellular wheel 4 and which is open in the direction of the associated counter blade 39 and is connected, in its radially inner end region, to a suction line 74.

The radial depth of each of the cells 35 of the second cellular wheel 4 is limited by bar 75 parallel to its axle 5. All stop bars 75 are disposed at an equal distance from the axle 5, such that the printed products P can be introduced, for the trimming of their lateral edges, precisely deeply enough into one respectively of the cells 35. The length of the circulating blades 36 and of the counter blades 39 is dimensioned such that printed products P of different height measured as the distance between fold and bloom—can be laterally trimmed in an identical manner.

Figure 4A:
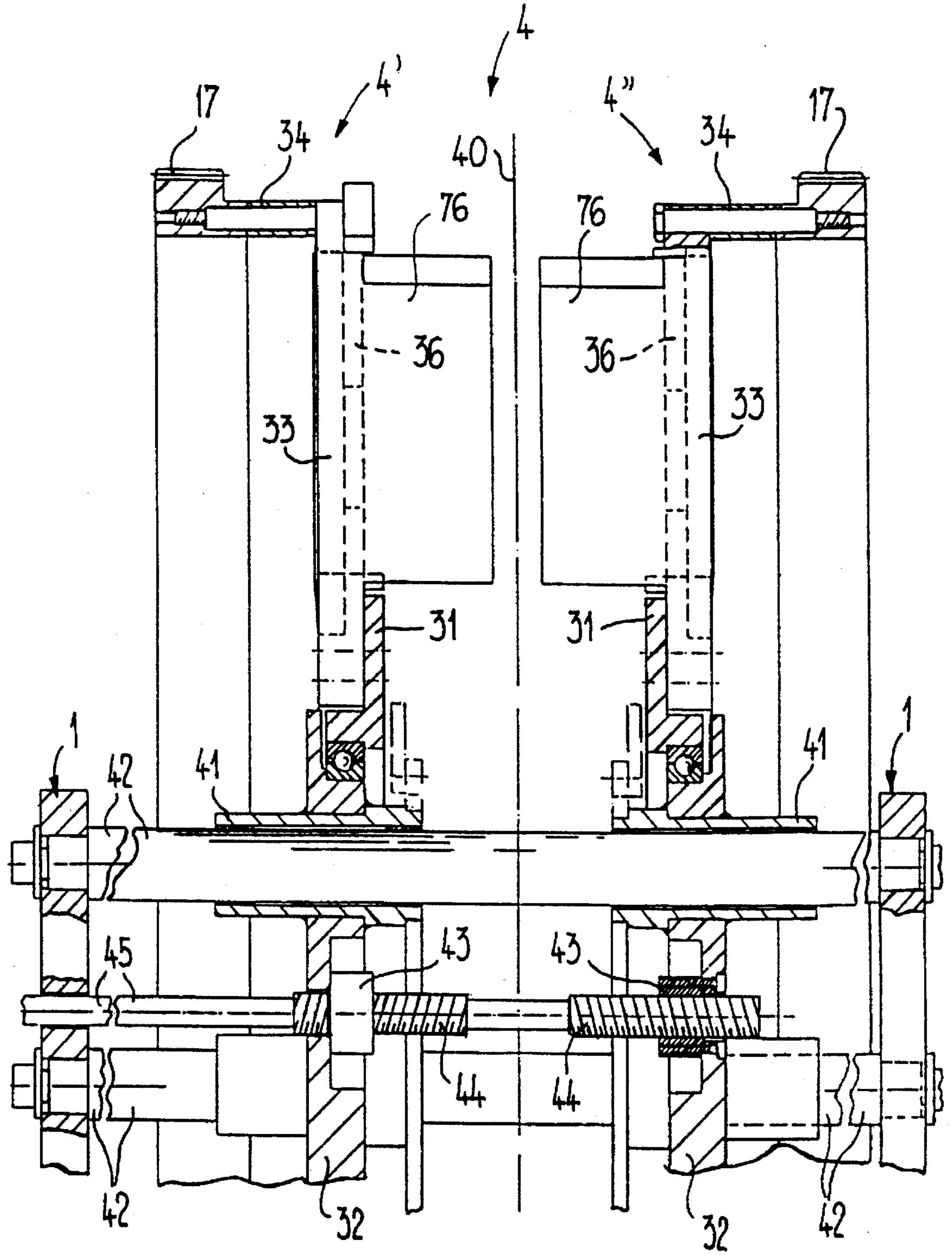
FIGS. 4A and B show the upper and lower part respectively of the section in the vertical plane IV—IV in FIG. 3.
Figure 4B:
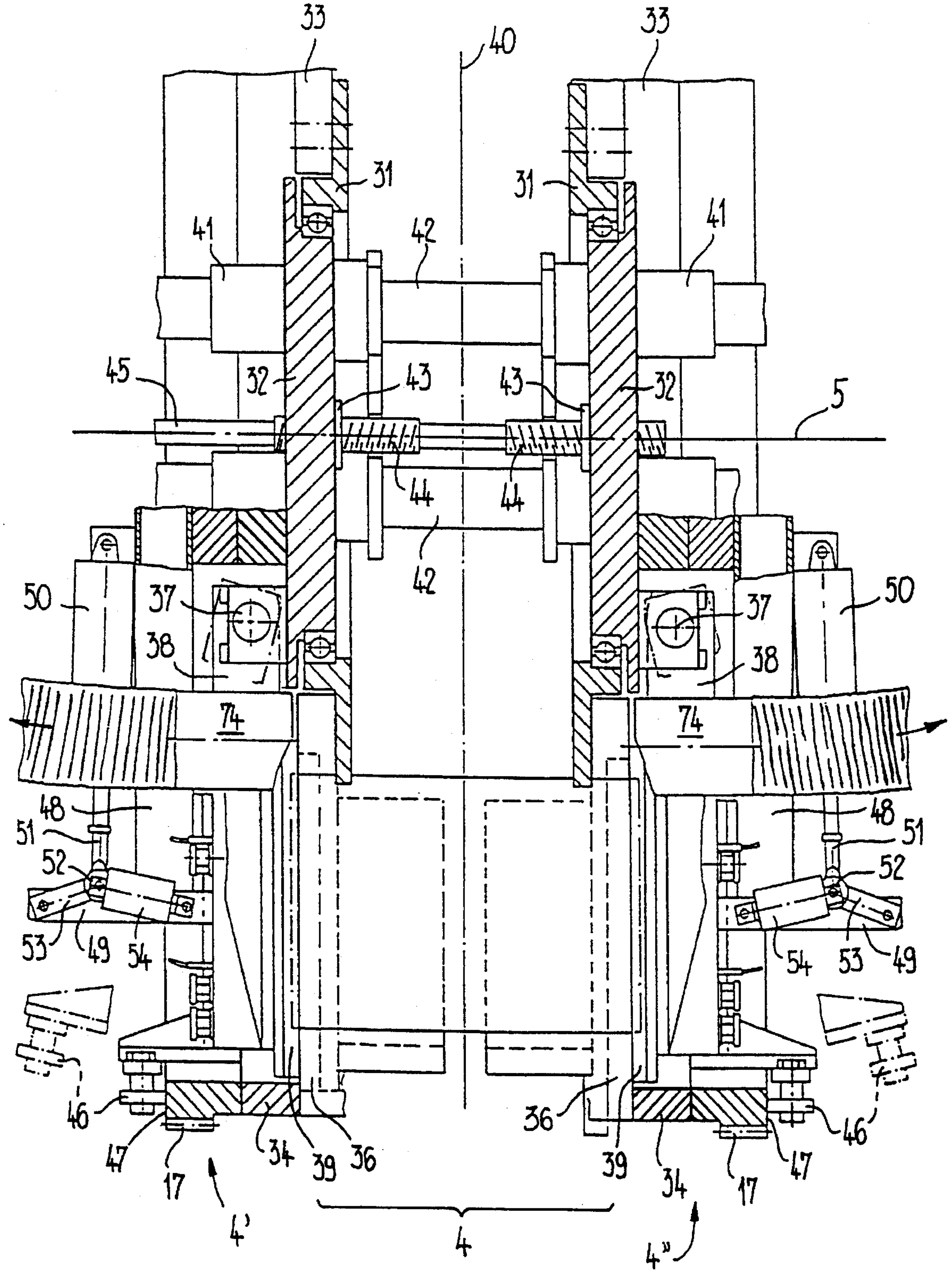
Figure 5:
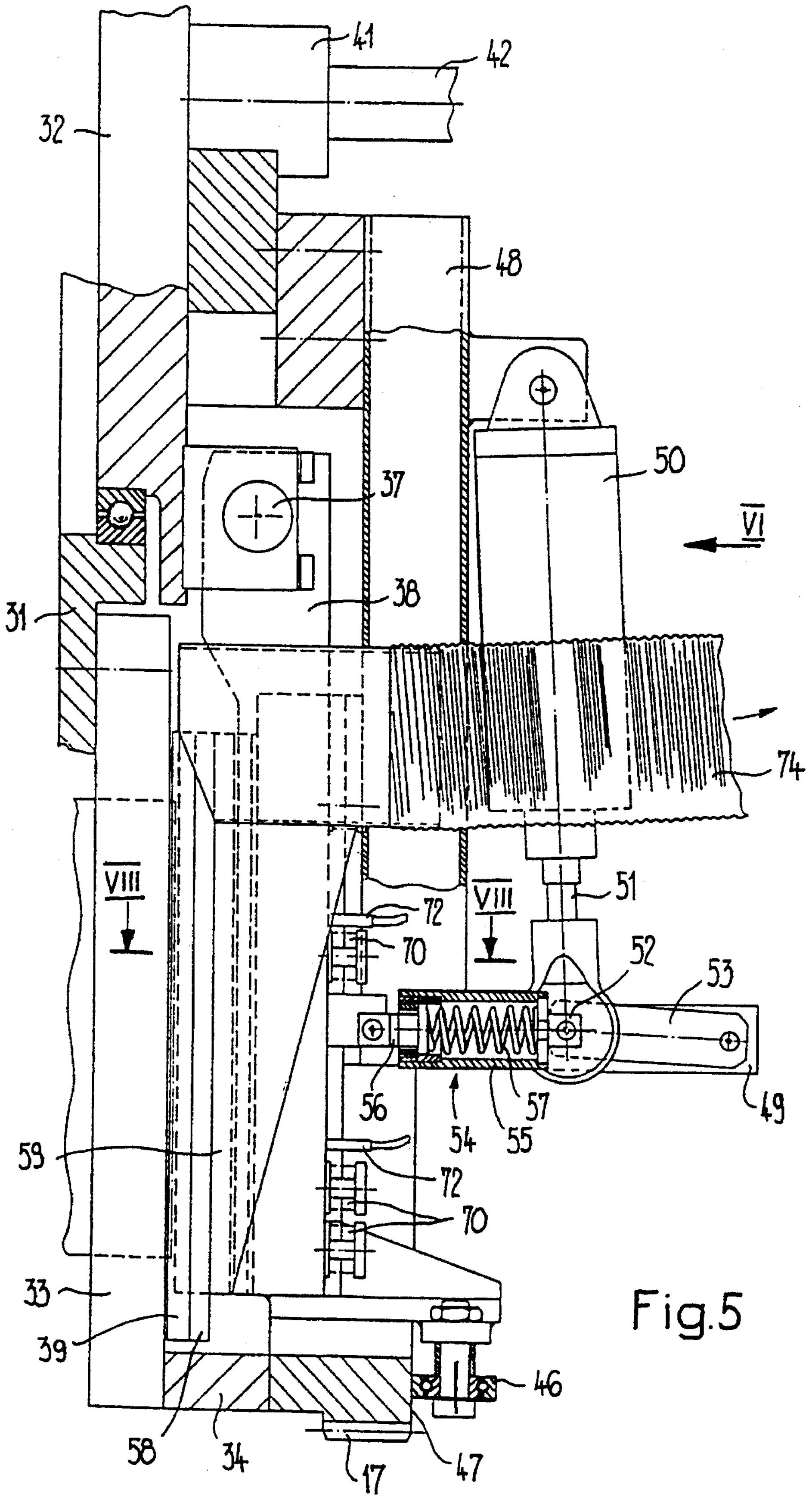
FIG. 5 shows a detail from FIG. 4B in enlarged representation.

To ensure that the printed products P introduced into one respectively of the cells 35 lie flat and do not sag, a wall section 76 is fastened to each of the spokes 33. If the two cellular wheel halves 4' and 4" of the second cellular wheel 4 are set to trim large-format printed products and are thus distanced well apart from each other, for example as represented in FIG. 4A, a small interspace can be left free between wall sections 76 which belong together, this being unharmful. Whenever the two cellular wheel halves 4' and 4" are moved closer together for the trimming of printed products of smaller format, the wall sections 76 slide telescopically over each other.

Figure 10:
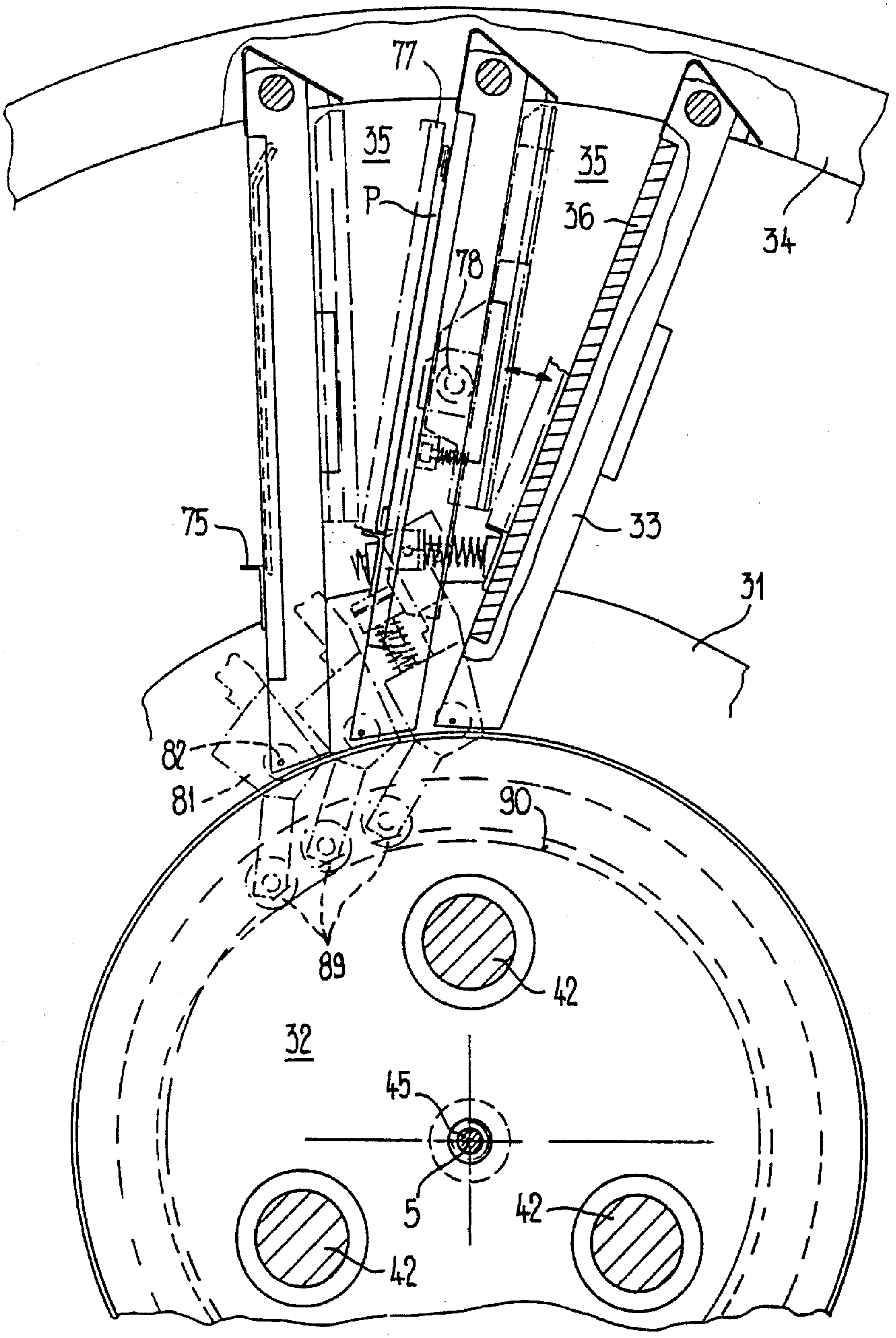
FIG. 10 shows the section in the vertical plane X—X in FIG. 2, in enlarged representation.
Figure 11:
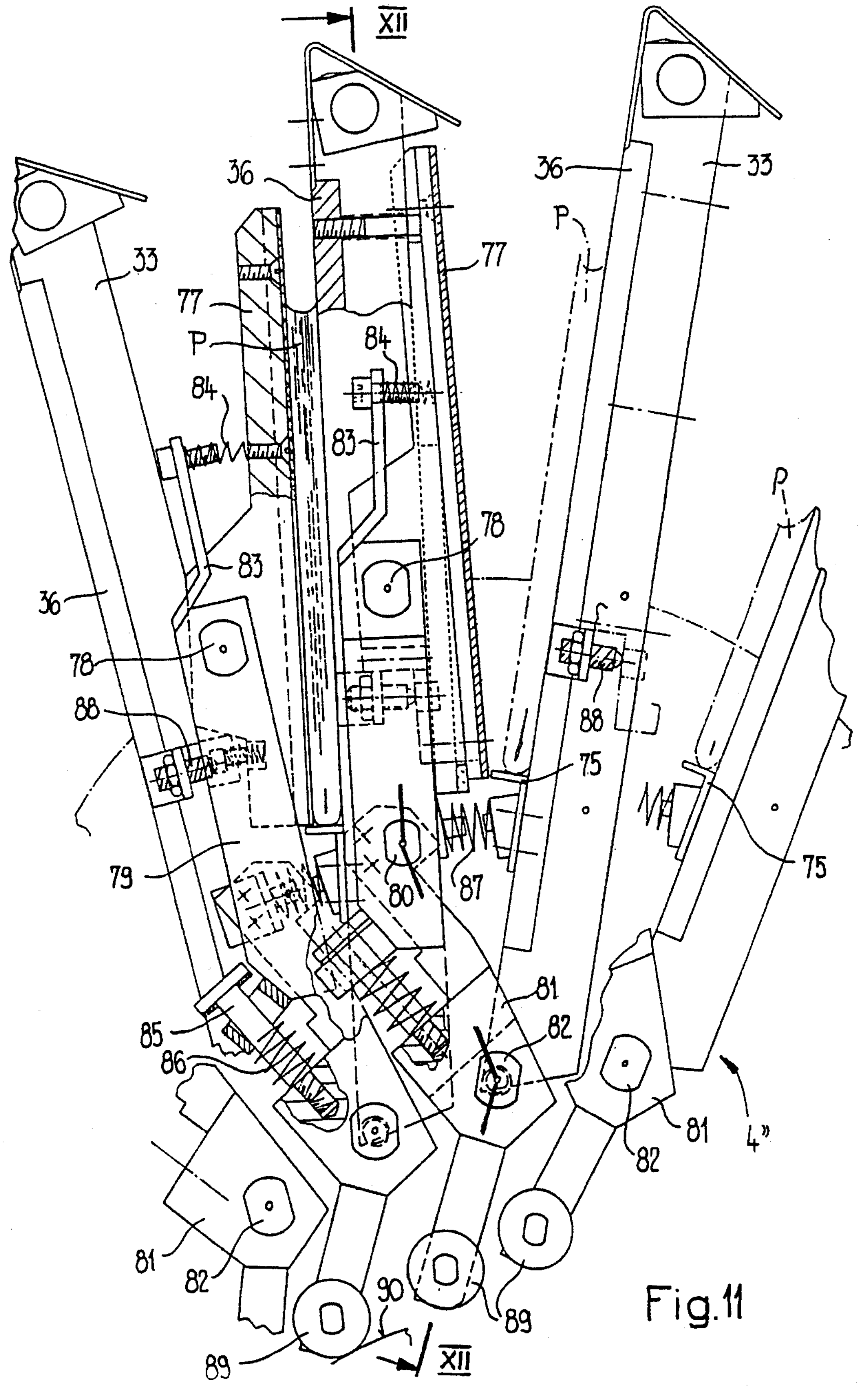
FIG. 11 shows a detail from FIG. 10, further enlarged.
Figure 12:
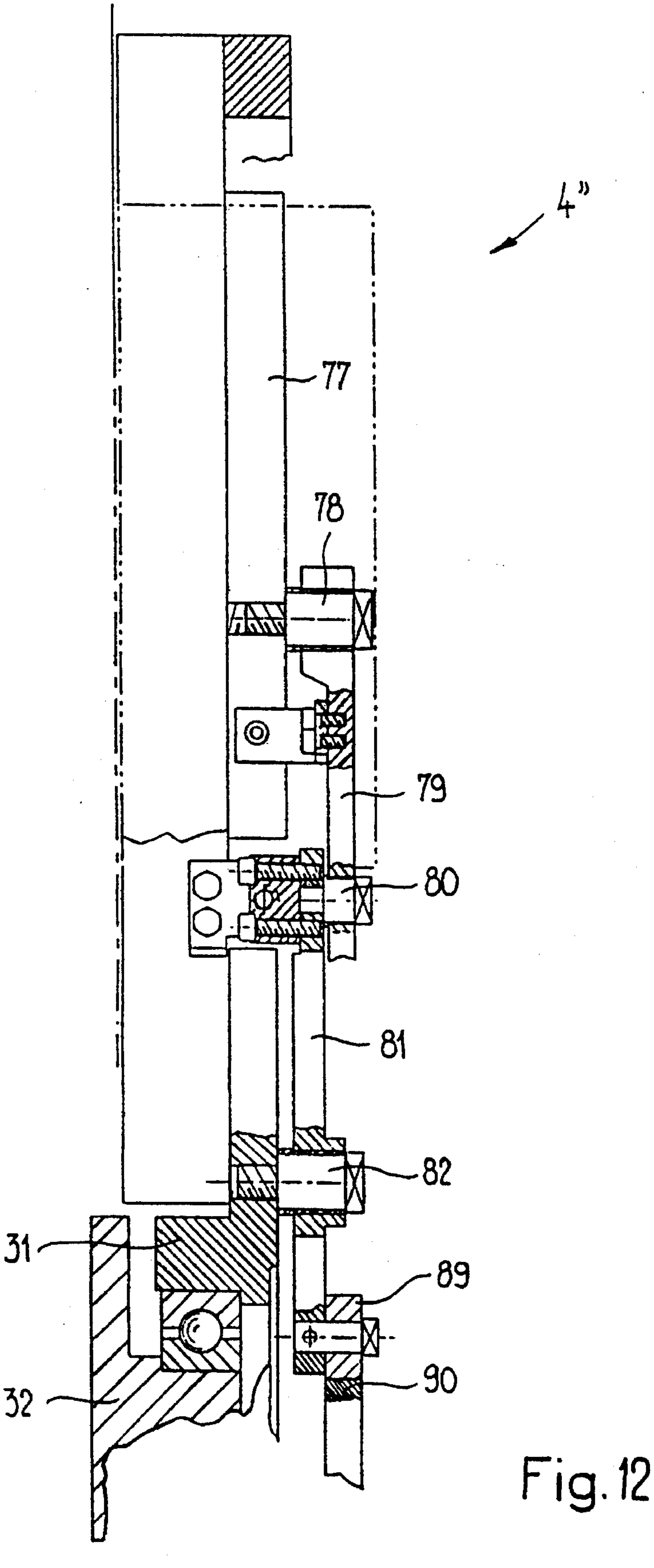
FIG. 12 shows the section XII—XII in FIG. 11.

Each of the cells 35 contains a pair of clamping bars 77, which are disposed parallel and in proximity to one respectively of the associated circulating blades 36 such that the printed product P introduced into the cell in question is firmly clamped, along both its edges which are due to be trimmed, between one respectively of the clamping bars 77 and the adjacent blade 36, prior to the trimming being commenced. Each of the clamping bars 77 is mounted according to FIGS. 10 to 12, by means of a joint 78, on a connecting rod 79, which is in turn mounted, by means of a bearing 80, on a twin-armed lever 81. The twin-armed lever 81 is mounted by means of a bearing 82 on the adjacent spoke 33. The geometrical axes of the bearings 80 and 82, like the axis of the joint 78, are parallel to the axle 5 of the second cellular wheel 4. The connecting rod 79 has a continuation 83 which essentially juts radially outwards; between the said continuation and the clamping bar 77 there is clamped a spring 84, which, in the represented example, is a screw-shaped compression spring.

The range of swivel of the twin-armed lever is limited by a tie rod 85. The twin-armed lever 81 is pretensioned by a spring 86—the represented spring being a screw-shaped compression spring through which the tie rod 85 extends—in such a way that it is intent on pulling the thereto connected clamping bar 77 away from the spoke 33 disposed in front of the said clamping bar—to its right in FIG. 11. Acting in the same direction is a spring 87, which is clamped between the connecting rod 79 and the spoke 33 lying in front of it. The swivel of the connecting rod 79 is limited by an adjustable stop 88 on the spoke 33 disposed behind it—to its left in FIG. 11. On that end of the twin-armed lever 81 remote from the connecting rod 79 there is mounted a roller 89, which is held by the pressure of the spring 86 in bearing contact against a control cam 90 on the associated bearing element 32. The printed products P can thereby be securely clenched, in adaptation to their thickness, in a predetermined position in the cell 35 which receives them.

The described device works as follows: Untrimmed printed products P are delivered by the conveyor 6 with their fold hanging downwards and are dropped into a respective cell 25 of the first cellular wheel 2. The drop is limited by a support 91 in the shape of arc-shaped bars which, in a feed region beneath the first cellular wheel 2, are fastened in a vertically adjustable manner to the stand 1. Upon the further rotation of the first cellular wheel 2, each of the printed products is firmly clamped in its cell 25 and then trimmed at its bloom and subsequently re-released, 80 that the printed product slips somewhat further downwards until it comes to rest with its fold on an arc-shaped rail 92 disposed below the first cellular wheel 2. The rail 92 is likewise vertically adjustable in order to adapt to different printed products and is fastened to the stand 1 such that it is additionally adjustable in the peripheral direction. The end of the rail 92 is bent downwards. As soon as a printed product P has reached this end, it drops out of its cell 25 into a cell 35, which is passing below it at the same instant, of the second cellular wheel 4.

In the cell 35, the printed product P is firmly clamped by means of the two clamping bars 77 and then trimmed along its two lateral edges. The clamping bars 77 are controlled by the control cams 90 in such a way that they re-release the now ready-trimmed printed product P, so that the latter now slips under gravitational pull, in a lower region of the second cellular wheel 4, partially out of the cell 35, until the bloom of the printed product comes up against an arc-shaped support 93 which is disposed there. This support 93 ends, in FIG. 1, on the right of the second cellular wheel 4, in a region somewhat beneath its axle 5, where the printed product P is no longer able, by its own accord, to slip further out of the cell 35. The printed product P is now however jutting radially far enough out over the wall sections 76 that it can be grabbed by a gripper 94 of the delivery conveyor 7 and transported onwards.

That which is claimed is:

1. An apparatus for trimming flat products along at least one edge thereof, said apparatus comprising a support stand (1), a cellular wheel (2;4) comprising a plurality of generally radially extending spokes (23;33) which define cells (25;35) therebetween which are disposed about the circumference of the wheel, a first blade member (26;36) mounted to each of said spokes along at least one side edge thereof so as to define a side edge of the associated cell, and a laterally facing annular running surface (47) fixed to the cellular wheel, bearing means mounting said cellular wheel and said annular running surface to said support stand for rotation about a central axis (3;5), at least one stationary counter blade (29;39) mounted to the support stand so as to be stationary with respect to the cellular wheel and so as to operatively cooperate with the first blade members mounted along said one side edge of said spokes upon rotation of said cellular wheel about said central axis for trimming the products along one edge thereof, said at least one counter blade being connected to a guide member (46) which is positioned to engage said annular running surface so as to maintain a predetermined clearance between said first blade members and said at least one counter blade.

2. The apparatus as defined in claim 1 wherein said annular running surface lies in a plane which is perpendicular to said central axis.

3. The apparatus as defined in claim 2 wherein said at least one counter blade and said guide member are both mounted to a cutter bar (28;38), and further comprising means pivotally mounting said cutter bar to said bearing means for movement between an operative position wherein said guide member is in engagement with said annular running surface and an inoperative position wherein said guide member is laterally withdrawn from said annular running surface.

4. The apparatus as defined in claim 3 wherein said means pivotally mounting said cutter bar to said bearing means includes means for spring biasing said cutter bar toward said operative position.

5. The apparatus as defined in claim 4 wherein said means pivotally mounting said cutter bar to said bearing means further includes a bearing (37) fixed to said bearing means so as to permit pivotal movement of said cutter bar and said at least one counter blade toward and away from said first blade members of said wheel, and toggle linkage means connected to said cutter bar for selectively moving said cutter bar and said at least one counter blade between said operative and said inoperative positions.

6. The apparatus as defined in claim 5 further comprising means (60) interconnecting said at least one counter blade and said cutter bar for permitting said at least one counter blade to laterally withdraw from said first blade members upon the occurrence of an overload of the trimming forces generated between said at least one counter blade and said first blade members.

7. The apparatus as defined in claim 5 further comprising means adjustably mounting said guide member to said cutter bar so as to permit adjustment of the relative positions of said at least one counter blade and said first blade members.

8. The apparatus as defined in claim 1 further comprising drive means for rotating said cellular wheel about said central axis.

9. An apparatus for trimming flat paper products along a first edge and along at least one of the two mutually opposite second edges extending perpendicular to said first edge, said apparatus comprising a support stand (1), a first cellular wheel (2), first bearing means (22) mounting said cellular wheel to said support stand for rotation about a vertical axis (3), said first cellular wheel comprising a plurality of generally radially extending spokes (23) which define upwardly and downwardly open cells (25) therebetween which are disposed about the circumference of the wheel, and a first blade member (26) mounted to each of said spokes along the upper side edge thereof, at least one stationary counter blade (29) mounted at the upper side of said first cellular wheel to operatively cooperate with the first blade members upon rotation of said first cellular wheel about said vertical axis for trimming the products (P) along said first edge thereof, first drive means (10, 11, 12) for rotating said first cellular wheel about said vertical axis, product delivery means (6) for serially delivering the products into the upwardly open cells of said first cellular wheel during rotation thereof and so that said first edges are above their opposite, parallel edges, first support means (91, 92) mounted below said open cells (25) so as to support the products with their opposite, parallel edges at a predetermined position within said cells, and with said first support means defining an end location at which the products are released to freely fall downwardly, a second cellular wheel (4), said second cellular wheel comprising a plurality of generally radially extending spokes (33) which define radially open cells (35) therebetween which are disposed about the circumference of the wheel, and a first blade member (36) mounted to each of said spokes along at least one side edge thereof so as to define a side edge of the associated cell, and a laterally facing annular running surface (47) fixed to the second cellular wheel, second bearing means (32) mounting said second cellular wheel and said annular running surface to said support stand for rotation about a horizontal axis at least one stationary counter blade (39) mounted to the support stand so as to be stationary with respect to the cellular wheel and so as to operatively cooperate with the first blade members (36) mounted along said one side edge of said spokes of said second cellular wheel upon rotation of said second cellular wheel about said horizontal axis (5) for trimming the products along at least one of said second edges, said at least one counter blade being connected to a guide member (46) which is positioned to engage said annular running surface so as to maintain a predetermined clearance between said first blade members and said at least one counter blade, second drive means (13, 14, 15, 16, 17) for rotating said second cellular wheel about said horizontal axis in synchronism with said first cellular wheel, said second cellular wheel being located below said first cellular wheel and below said end location of said first support means (91, 92) and so that the printed products drop from the cells (25) of the first cellular wheel into the cells (35) of the second cellular wheel during rotation of said wheels, and product withdrawal means for serially withdrawing the trimmed flat products from the radially open cells of said second cellular wheel during rotation of said second cellular wheel.

10. The apparatus as defined in claim 9 wherein said second cellular wheel further comprises at least one clamping bar (77) associated with each of said cells (35) and mounted to said second bearing means, and cam means (90) for activating each of said one clamping bars during rotation of said second cellular wheel such that at least the edge of the product received in each cell which is adjacent the associated first blade member is firmly clamped during the edge trimming operation.

11. The apparatus as defined in claim 9 wherein said first support means disposed below said first cellular wheel is vertically adjustable.

12. The apparatus as defined in claim 9 wherein said second cellular wheel further comprises a lower region comprising a second support means (93) mounted on the periphery of said second cellular wheel for supporting the laterally trimmed products in a ready-to-remove position.

13. The apparatus as defined in claim 9 wherein said product delivery means is configured to deliver products having a folded leading edge into the upwardly open cells of said first cellular wheel such that the products are trimmed along the edge opposite the folded edge in the first cellular wheel and along at least one of said two mutually opposite second edges extending perpendicular to said folded edge in said second cellular wheel.

* * * * *